United States Patent [19]

Dunlop

[11] 4,219,487

[45] Aug. 26, 1980

[54] TRIS[5-HYDROXYMETHYLFURFURYL]AMINE AND PROCESS OF PREPARATION

[75] Inventor: Andrew P. Dunlop, Riverside, Ill.

[73] Assignee: The Quaker Oats Company, Chicago, Ill.

[21] Appl. No.: 62,369

[22] Filed: Jul. 31, 1979

[51] Int. Cl.$^2$ .......................................... C07D 307/52
[52] U.S. Cl. ................................... 260/347.7; 528/73
[58] Field of Search ..................................... 260/347.7

[56] References Cited

U.S. PATENT DOCUMENTS

| | | | |
|---|---|---|---|
| 2,995,582 | 8/1961 | Garber et al. | 260/347.7 |
| 4,124,604 | 11/1978 | Yu | 260/347.7 |
| 4,162,327 | 7/1979 | Knoll | 260/347.7 X |

*Primary Examiner*—Richard Raymond
*Attorney, Agent, or Firm*—Neuman, Williams, Anderson & Olson

[57] ABSTRACT

New compositions of matter are tris[5-hydroxymethylfurfuryl]amine and the hydrochloride salt thereof.

3 Claims, No Drawings

TRIS[5-HYDROXYMETHYLFURFURYL]AMINE AND PROCESS OF PREPARATION

This invention relates to new polyol compositions of matter.

The new compositions of matter of this invention are tris[5-hydroxymethylfurfuryl]amine and the hydrochloride salt thereof. The formula for tris[5-hydroxymethylfurfuryl]-amine is:

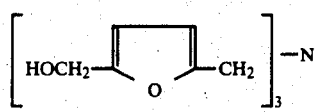

The above new composition of matter is readily produced in substantially quantitative yields at relatively low temperatures by admixing 1 mole of ammonium chloride with 3 moles of formaldehyde in aqueous solution and adding thereto furfuryl alcohol (3 moles) while maintaining the mixture below 45° C. and preferably below 35° C. The resulting solution contains the product tris[5-hydroxymethylfurfuryl]-amine hydrochloride which, upon neutralization with a base such as sodium hydroxide, yields the free base.

The following example illustrates the synthesis of the new compositions of matter.

EXAMPLE

A mixture of 243.2 grams (3 moles) of formalin (37% aqueous solution of formaldehyde), and 53.5 grams (1 mole) of ammonium chloride is stirred until dissolution of solids is complete. Then 294.0 grams of furfuryl alcohol (3.0 moles) is added incrementally over a period of 72 minutes while maintaining the temperature at approximately 20° C. The reaction is exothermic in nature and cooling means should be available. After addition of all of the furfuryl alcohol the mixture is stirred an additional four hours while being maintained at a temperature of approximately 29° C. The reaction product, tris[5-hyroxymethylfurfuryl]-amine hydrochloride is completely soluble in the aqueous mixture. To separate the free base, 40 grams of sodium hydroxide in 40 milliliters of water is added with stirring. The mixture is separated in a separating funnel with a viscous brown syrup containing the product being obtained.

The viscous brown syrup is subjected to gel permeation chromatography using as the solvent tetrahydrofuran. The major component isolated is tris[5-hydroxymethylfurfuryl]-amine having the structural formula:

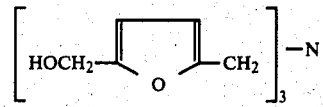

The structure of the above compound is confirmed by infrared, mass spectral analysis and nuclear magnetic resonance analysis. The proton (acetone-$d_6$) NMR spectrum of this compound shows single peaks at $\delta 3.68$, $\delta 3.90$, $\delta 4.58$ and $\delta 6.2$ ppm assigned to —$CH_2N$, —OH, —$CH_2O$— and vinyl protons on a 2,5-disubstituted furan ring, respectively. Protonation of the amine compound by acidification with trifluoroacetic acid shows the expected changes in the nuclear magnetic resonance spectrum, that is, downfield shifts for the —$CH_2N$ and OH resonance peaks, and splitting of the furan vinyl proton resonance peak into a pair of doublets. Mass spectral analysis of the compound by direct insertion probe at 200° C. shows the following peaks: $m/e=347$; $m/e=329$; $m/e=236$ and $m/e=111$.

Tris(5-hydroxymethylfurfuryl)amine is a liquid which is soluble in methanol, furfuryl alcohol, ethylene glycol, triethylene glycol, 2-ethoxyethanol, polyethylene glycol, and dilute aqueous acids, such as hydrochloric acid and oxalic acid. It is insoluble or only slightly soluble in tetrahydrofuran, ethylene chloride, water, acetone, polypropylene glycol and ethylene glycol dimethyl ether.

The tris[5-hydroxymethylfurfuryl]amine is particularly useful for incorporation in polyurethane compositions to enhance the fire resistance charateristics of the compositions. Thus, for example, about 4 parts by weight of the tris[5-hydroxymethylfurfuryl]amine are admixed with 4 parts of diphenyl methane diisocyanate at room temperature and stirred. In a period of about 3 minutes the reaction is substantially complete, with the formation of a tough, hard foam. Similarly, about 4 parts by weight of tris[5-hydroxymethylfurfuryl]amine are dissolved in 2 milliliters of acetonitrile which is employed as a flowing agent. This solution is admixed with 4 parts of diphenylmethane diisocyanate and the resulting mixture quickly results in a hard, tough foam which is somewhat expanded in nature.

Those modifications and equivalents which fall within the spirit of the invention are to be considered a part thereof.

What is claimed is:

1. A new composition of matter selected from the group consisting of tris[5-hydroxymethylfurfuryl]amine and the hydrochloride salt thereof.

2. A process for preparing tris[5-hydroxymethylfurfuryl]amine hydrochloride which comprises mixing together ammonium chloride and formalin and adding in increments to the resulting mixture furfuryl alcohol while maintaining the reaction mixture below a temperature of about 45° C. and recovering the resulting solution containing tris[5-hydroxymethylfurfuryl]amine hydrochloride.

3. A process according to claim 2 wherein the product tris[5-hydroxymethylfurfuryl]amine hydrochloride is neutralized with a base and the product tris[5-hydroxymethylfurfuryl]amine is recovered.

* * * * *